United States Patent [19]
Tanizoe

[11] Patent Number: 5,998,943
[45] Date of Patent: Dec. 7, 1999

[54] EXTERNAL MAGNETIC FIELD CORRECTION DEVICE AND CRT DISPLAY DEVICE

[75] Inventor: Hideki Tanizoe, Tokyo, Japan

[73] Assignee: Mitsubishi Denki Kabushiki Kaisha, Tokyo, Japan

[21] Appl. No.: 09/026,892

[22] Filed: Feb. 20, 1998

[30] Foreign Application Priority Data

Aug. 18, 1997 [JP] Japan ................................. 9-221485

[51] Int. Cl.$^6$ .................................................. H01J 29/56
[52] U.S. Cl. .............................. 315/370; 315/8; 315/387; 315/388
[58] Field of Search ......................... 315/368.16, 368.18, 315/368.25, 399, 397, 387, 388, 370, 8

[56] References Cited

U.S. PATENT DOCUMENTS

| | | | |
|---|---|---|---|
| 5,021,720 | 6/1991 | Aimura | 315/370 |
| 5,583,401 | 12/1996 | Inoue et al. | 315/370 |
| 5,828,189 | 10/1998 | Strzelichowski et al. | 315/368.24 |

FOREIGN PATENT DOCUMENTS

| | | |
|---|---|---|
| 2-124082 | 5/1990 | Japan . |
| 2-214288 | 8/1990 | Japan . |

*Primary Examiner*—Don Wong
*Assistant Examiner*—Wilson Lee

[57] ABSTRACT

An external magnetic field correction device capable of preventing malfunctions of the external magnetic field correction device due to operation of a degaussing circuit by judging that an abnormality has occurred when an output of an external magnetic field detector is not less than a predetermined value and interrupting offset adjustment process accordingly, and that is capable of limiting irregularities of offset current in operational current of the magnetic field correction device to predetermined value or less by adjusting an offset value as to make correction current to be supplied to an external magnetic field correction coil when an external magnetic field around a CRT is zero to a regular value or less.

12 Claims, 10 Drawing Sheets

FIG. 8

EXTERNAL MAGNETIC FIELD CORRECTION DEVICE AND CRT DISPLAY DEVICE

BACKGROUND OF THE INVENTION

The present invention relates to an external magnetic field correction device for automatically correcting influences of external magnetic field caused by geomagnetism on image quality, and to a CRT (cathode-ray tube) display device employing the same.

FIG. 1 is a block diagram showing a constitution of a conventional external magnetic field correction device of a CRT display device as described, for instance, in Japanese Patent Application Laid-Open No. 2-214288 (1990).

In FIG. 1, 1 denotes a CRT (cathode-ray tube), 2 a horizontal direction (the direction along the tube axial) magnetic field correction coil, 3 a vertical direction (the direction orthogonal to the tube axis) magnetic field correction coil, 4 a horizontal direction magnetic field sensing element, 5 a bias circuit, 6 an amplifying circuit, 7 an offset voltage generating circuit, 8 an adder to which an output of the amplifying circuit 6 and an output of the offset voltage generating circuit 7 are input, 9 a smoothing circuit to which an output of the adder 8 is input, and 10 a current, driving circuit for horizontal magnetic field correction to which an output of the smoothing circuit 9 is input and which output is supplied to the horizontal direction magnetic field correction coil 2.

On the other hand, 11 denotes a vertical direction magnetic field sensing element, 12 a bias circuit, 13 an amplifying circuit, 14 an offset voltage generating circuit, 15 an adder to which an output of the amplifying circuit 13 and an output of the offset voltage generating circuit 14 are input, 16 a smoothing circuit to which an output of the adder 15 is input, and 17 a current driving circuit to which an output of the smoothing circuit 16 is input and which output is supplied to the vertical direction magnetic field correction coil 3.

FIG. 2 is a block diagram showing a constitution of a conventional external magnetic field correction device of a CRT display device as described, for instance, in Japanese Patent Application Laid-Open No. 60-118879 (1985).

In FIG. 2, 4 denotes a horizontal direction magnetic field sensing element, 37 a memory (non-volatile memory) for storing a detected magnetic field intensity detected by the horizontal direction magnetic field sensing element 4, and 20 a magnetic field intensity difference detector for detecting a difference in magnetic field intensity at a predetermined position stored in the memory 37 and at a different position detected by the horizontal direction magnetic field sensing element 4.

The output, of the magnetic field intensity difference detector 20 is input, in the current driving circuit for horizontal magnetic field correction 10, and the output of the current driving circuit for horizontal magnetic field correction 10 is supplied to the horizontal direction magnetic field correction coil 2.

The Operations Will Now Be Explained.

In FIG. 1, the CRT 1 of the display device is disposed in a magnetic field that is a combination of a magnetic field generated by the horizontal direction magnetic field correction coil 2 and the vertical direction magnetic field correction coil 3 as well as an external magnetic field.

The horizontal direction magnetic field sensing element 4 is disposed into this magnetic field for converting an intensity and polarity of the magnetic field into electric signals.

The output voltage of the horizontal direction magnetic field sensing element 4 disposed in the magnetic field corresponds to a sum of horizontal components of the external magnetic field of the magnetic field in which the horizontal direction magnetic field sensing element 4 is disposed and a magnetic field generated by the horizontal direction magnetic field correction coil 2. Since the output of the horizontal direction magnetic field sensing element 4 is minute, it is amplified by the amplifier 6.

The output voltage generating circuit 7 generates a direct current which absolute value is equal to and which polarity is opposite to that of an amplified detected voltage outputted by the amplifying circuit 6 when the intensity of the magnetic field of the area in which the horizontal direction magnetic field sensing element 4 is disposed is zero.

The amplified detected voltage output by the amplifying circuit 6 when the intensity of the magnetic field in which the horizontal direction magnetic field sensing element 4 is disposed is zero varies for each individual product due to irregularities such as manufacturing irregularities of the horizontal direction magnetic field sensing element 4, irregularities in positional relationship between the horizontal direction magnetic field sensing element 4 and magnetic bodies that are employed for use, for instance, in chassis composing parts, or irregularities in parts composing the amplifying circuit. Therefore, the offset voltage generating circuit 7 needs to perform adjustment for each individual product.

The adder 8 outputs a zero value when the magnetic field intensity of the area in which the horizontal direction magnetic field sensing element 4 is disposed is zero, a negative value to a magnetic field generated when the horizontal direction magnetic field correction coil 2 is supplied with preliminarily prescribed positive current, and a positive value to a magnetic field generated when the horizontal direction magnetic field correction coil 2 is supplied with preliminarily prescribed negative current. The output of the adder 8 is smoothed by the smoothing circuit 9.

The output of the smoothing circuit 9 is inputted to the current driving circuit for horizontal magnetic field correction 10. The current driving circuit for horizontal magnetic field correction 10 is constituted by a circuit which is capable of bi-directionally supplying current, and supplies current to the horizontal direction magnetic field correction coil 2.

With this constitution, a control loop is formed in which the sum of the magnetic field generated by the horizontal direction magnetic field correction coil 2 and the horizontal directional component of the external magnetic field detected by the horizontal direction magnetic field sensing element 4 is converged to zero.

While the above explanations have been made for the horizontal direction magnetic field correction, the same applies to the vertical direction magnetic field correction.

Next, conventional the external magnetic field correction device according to FIG. 2 will be explained.

First, arranging positions of deflection coil etc. (not, shown) and electric magnetic characteristics are adjusted at manufacturing stages (process of combining/assembling with the deflection coil) of a CRT (not shown).

At this point, this adjustment as well as an external magnetic field intensity detected by a horizontal direction magnetic field sensing element. 4 are stored in a memory 37. In this condition, the CRT display device is completed and ready for shipping.

When using the CRT display device at a place to which it has been shipped, a current that is proportional to a difference between the detected value for the external magnetic field intensity at that place detected by the horizontal direction magnetic field sensing element 4 and the magnetic field intensity stored in the memory 37 is provided from the magnetic field intensity difference detector 20 to the horizontal direction magnetic field correction coil 2 through the current driving circuit for horizontal magnetic field correction 10, and by a magnetic field generated by the horizontal direction magnetic field correction coil 2, an external magnetic field (in a tube axial direction) with respect to the CRT (not shown) is forcibly corrected to be equal to the external magnetic field for the place at which the CRT has been adjusted (place of manufacturing).

The above constitution of the conventional external magnetic field correction device of a CRT display device presents the following drawbacks.

In the example of FIG. 1, the operation of the offset voltage generating circuit 7 needs to perform adjustment for each individual product so that it takes a long time for the adjustment and thus resulting in higher manufacturing costs.

In case the place of arrangement or the orientation of the CRT display device has been changed, it is required to degauss the whole display device including the CRT by using an internal degaussing circuit or an external device in order to make the CRT display device present maximum performance.

When an internal degaussing circuit or an external degaussing device is operated, an abnormally large magnetic field is detected for a peripheral magnetic field of the horizontal direction magnetic field sensing element 4 as compared to a normal external magnetic field such as geomagnetism so that malfunctions may occur in the case of FIG. 1.

In other words, the smoothing circuit 9 as described in the example of FIG. 1 is effective to disturbance levels such as high harmonic noise that is impressed at normal operation and is required to be operated within an operational response time (within a few seconds) that is without hindrance when placing environment is changed or power source is inputted;

however, it can not eliminate an influence of an abnormally large magnetic field which may be generated when an internal degaussing circuit or an external degaussing device is operated.

Therefore, when malfunctions of the magnetic field correction device occurs while an internal degaussing circuit or an external degaussing device is operated so that abnormal current runs through the correction coil, it may cause a drawback in that the display device is reversely magnetized so that it may remarkably degrade the performance of the external magnetic field correction device.

On the other hand, the problem of malfunctions due to operations of an internal degaussing circuit or an external degaussing device that arises in the conventional art of FIG. 1 also exists for the example of FIG. 2.

In the manufacturing stage (process of combining/ assembling with the deflection coil) of the CRT (not shown), when adjusting an arranging position of the deflection coil (not shown) or electric magnetic characteristics, it is required to set irregularities in offset current originating in operational irregularities of the magnetic field detector, difference detector or amplifier to be less than a regular value.

This is to assure assembling/adjusting conditions (peripheral magnetic field) for designing a CRT or deflection yoke.

In other words, although it seems that the conventional art according to FIG. 2 solves, by the provision of a memory and a difference detector, each of the irregularities in outputs of the magnetic field detector which presents a problem after the product has been shipped, it does still not solve the problem of initial deviation which presents a problem at the time of assembling the product.

Therefore, it is required to adjust offset current also.

BRIEF SUMMARY OF THE INVENTION

The present invention has been made to solve the above problems, and it is an object of the present invention to provide an external magnetic field correction device which is capable of automatically limiting irregularities in offset current of an operational current for an external magnetic field correction coil which may cause a problem in a manufacturing process of a CRT display to not more than a predetermined value.

The external magnetic field correction device according to the present invention is characterized in that it comprises an external magnetic field detector for detecting an external magnetic field around a CRT, an external magnetic field correction coil disposed around the CRT for correcting the external magnetic field, a current driving circuit for external magnetic field correction for supplying to the external magnetic field correction coil correction current for correcting the external magnetic field on the basis of a detected value of the external magnetic field detector, and an offset value adjusting unit for adjusting an offset value for the current driving circuit for external magnetic field so that an output of the current driving circuit for external magnetic field at the time that the external magnetic field around the CRT is zero is made to be not more than a predetermined value, and for storing an adjusted value.

With this constitution, the offset value for the current driving circuit for external magnetic field can be adjusted to not more than a predetermined value and offset adjustment of the current driving circuit for external magnetic field can be always easily performed, regardless to the place of set, whereby the trouble of adjustment can be saved and high correction accuracy can be achieved.

It is another object of the present invention to provide an external magnetic field correction device which is capable of limiting the problem of malfunction originating in operation of an internal degaussing circuit or an external degaussing device.

The external magnetic field correction device according to the present invention is characterized in that it further comprises an abnormal input eliminating unit for determining that an abnormality has occurred when the output of the external magnetic field detector is not less than a predetermined value and accordingly interrupting operation of the offset value adjusting unit.

Therefore, since it is determined that an abnormality has occurred when the output of the external magnetic field detector is not less than a predetermined value and the operation of the offset value adjusting unit is accordingly interrupted, no malfunction occurs even if an abnormal input due to degaussing operation or the like is made so that the device is highly reliable.

The external magnetic field correction device according to the present invention is characterized in that the offset value adjusting unit includes a communication means for receiving from an external adjustor means instructions for adjusting the offset value for the current driving circuit for external magnetic field correction.

Therefore, the offset value for the current driving circuit for external magnetic field correction is adjusted with an external adjustor means by using a communication means included in the offset value adjusting unit, whereby adjustment may be performed by an external automatic adjusting means without there being a need for the user to perform manual adjustments.

The external magnetic field correction device according to the present invention further comprises an external magnetic field correction coil current detecting circuit for detecting a value for a current running through the external magnetic field correction coil, and the external magnetic field correction coil current detecting circuit is a resistor serially connected to the external magnetic field correction coil.

Therefore, the correction current running through the external magnetic field correction coil can be accurately detected by a simple constitution, regardless to irregularities in resistance values of the external magnetic field correction coil.

It is still another object of the present invention to provide a CRT display device comprising such an external magnetic field correction device.

The CRT display device according to the present invention is characterized in that it comprises a CRT display and the above-described external magnetic field correction device.

With this constitution, it is achieved that a CRT display device is realized which is capable of adjusting an offset of the above-described current driving circuit for external magnetic field correction to not more than a predetermined value, capable of always easily performing offset adjustment of the current driving circuit for external magnetic field correction, regardless of the place of set, capable of eliminating the trouble of adjustment, and that exhibits external magnetic field correction functions of high accuracy, and that a CRT display is realized which exhibits highly reliable external magnetic field correction functions and no malfunctions occur even at abnormal input due to degaussing operations.

The CRT display device according to the present invention is characterized in that it comprises an OSD circuit for making an adjusting menu for providing instructions to perform correction of external magnetic field to the external magnetic field correction device to be displayed on the CRT display.

Therefore, since correction of the external magnetic field is performed by following a preliminarily set adjusting menu, it is possible to perform adjustment of external magnetic field correction by using a matrix switch for screen adjustment that is provided in a front face of the CRT display device and by using OSD functions (on screen display functions) instead of instruction switches connected to an input terminal of a microcomputer, whereby instruction switches or display devices (LED, light emitting diode) can be omitted.

The above and further objects of the invention will more fully be apparent from the following detailed description with accompanying drawings.

BRIEF DESCRIPTION OF THE SEVERAL VIEWS OF THE DRAWINGS

FIG. 8 is a block diagram showing a constitution of an external magnetic field correction device according to embodiment 3.

DETAILED DESCRIPTION OF THE INVENTION

Embodiment 1

Figure 1:
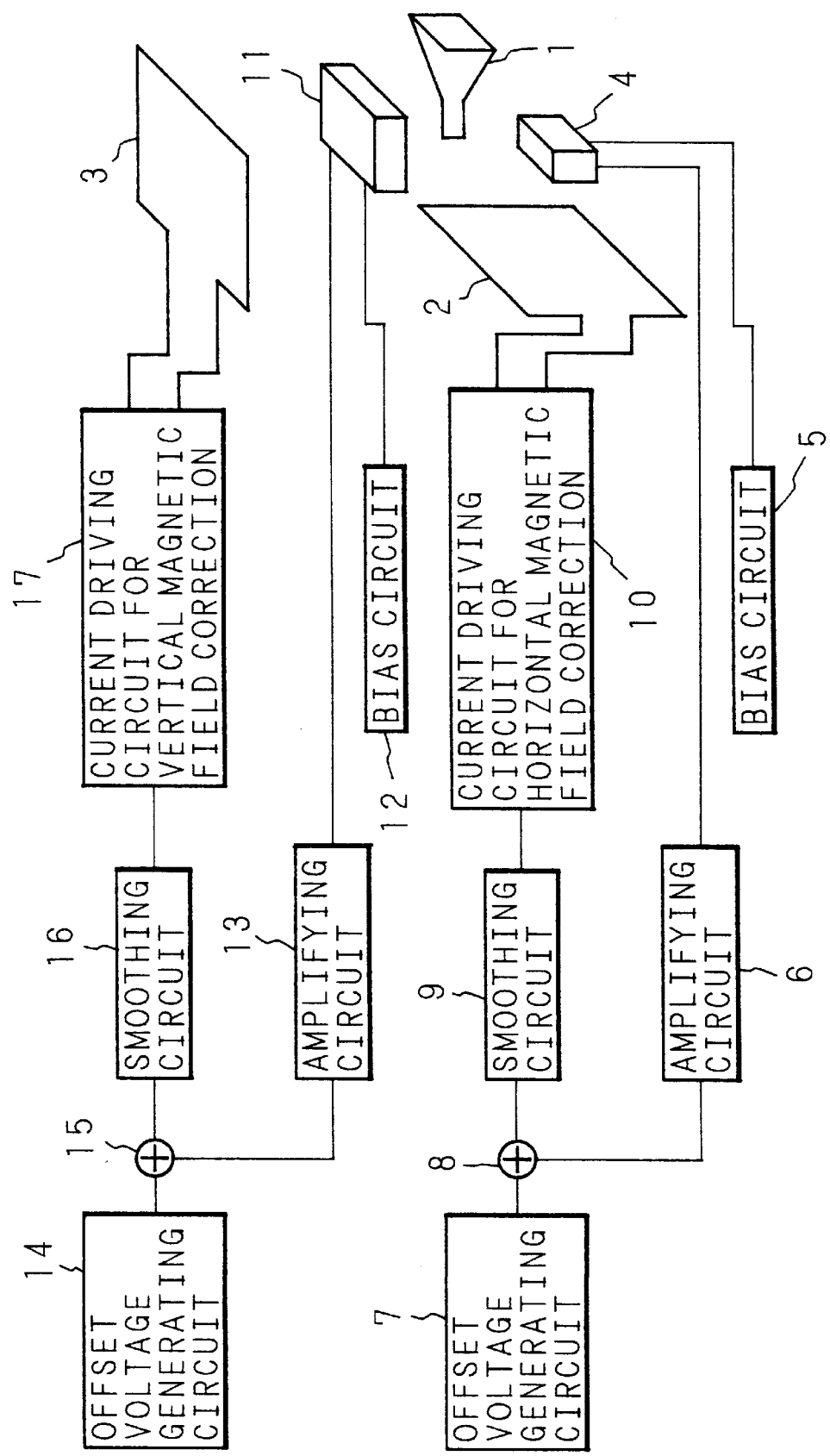
FIG. 1 is a block diagram showing a conventional external magnetic field correction device of a CRT display device.
Figure 2:
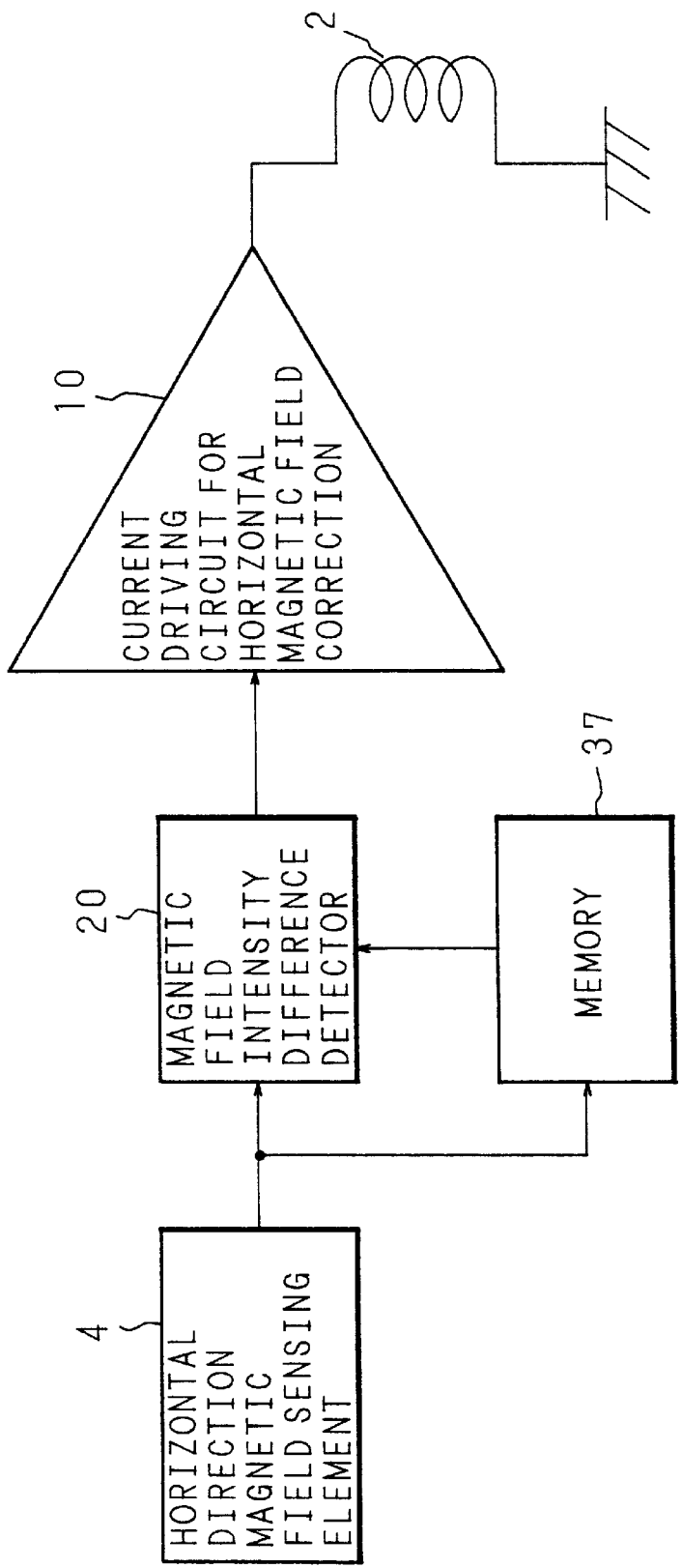
FIG. 2 is a block diagram showing another conventional external magnetic field correction device of a CRT display device.

Embodiments of the present invention will now be explained with reference to the drawings. It should be noted that portions that are identical with or equivalent to those of the conventional art are denoted with the same reference numerals as in FIG. 1.

Figure 3:
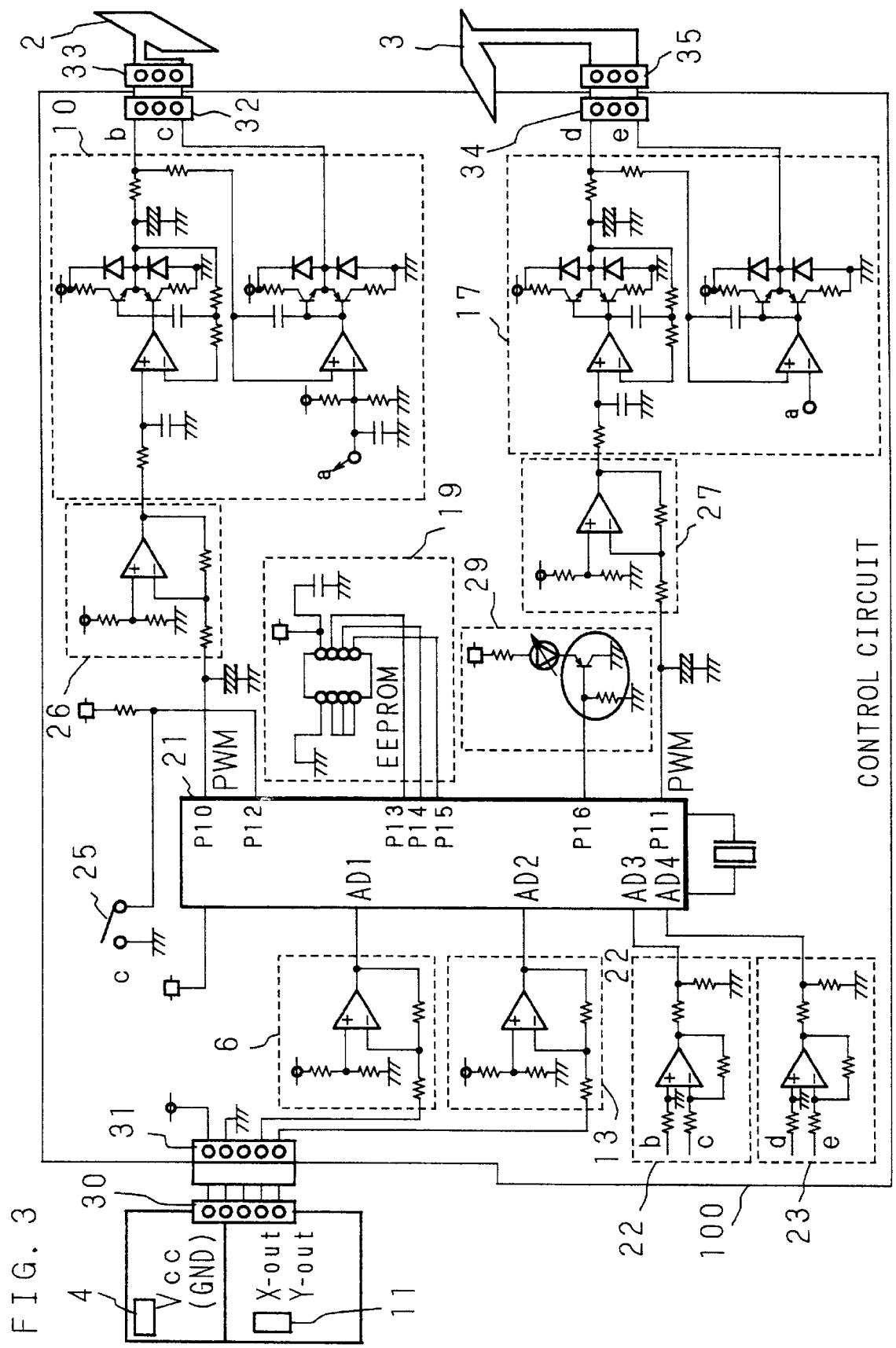
FIG. 3 is a block diagram showing a constitution of an external magnetic field correction device according to embodiment 1.

FIG. 3 is a block diagram showing a constitution of an external magnetic field correction device according to embodiment 1.

In FIG. 3, 2 denotes a horizontal direction magnetic field correction coil for canceling an external magnetic field in a horizontal direction (the direction along the tube axial) which is connected to an output terminal of a current driving circuit for horizontal magnetic field correction 10 through a connector 33 attached to the horizontal direction magnetic field correction coil 2 and through a connector 32 on a control circuit 100.

An input line of the current driving circuit for horizontal magnetic field correction 10 is connected to a D/A converting output terminal P10 of a microcomputer 21 through a voltage amplifying circuit 26.

There are respectively connected a tact switch (or also called instruction switch) 25 to an input terminal P12 of the microcomputer 21, a non-volatile memory (EEPROM) 19 to input/output terminals P13, P14, P15, and a display device (LED) 29 to an output terminal P16.

An output terminal of a voltage amplifying circuit 6 is connected to an A/D converting input terminal AD1 of the microcomputer 21, and an output line of a horizontal direction magnetic field sensing element, (or also called horizontal magnetic field sensor) 4 to an input terminal of the voltage amplifying circuit 6.

An output of an horizontal magnetic field correction current detecting circuit 22 is connected to an A/D converting input terminal AD3 of the microcomputer 21, and two differential input terminals of a horizontal magnetic field correction current detecting circuit 22 are connected to both ends of the horizontal direction magnetic field correction coil 2 through the connector 32, to which voltage generated by direct-current resistance of the horizontal direction magnetic field correction coil 2 is applied. Further, the AD3 terminal is applied with voltage that corresponds to the current running through the horizontal direction magnetic field correction coil 2.

3 denotes a vertical direction magnetic field correction coil for canceling an external magnetic field in a vertical direction (the direction orthogonal to the tube axis) which is connected to an output terminal of a current driving circuit for vertical magnetic field correction 17 through a connector 35 attached to the vertical direction magnetic field correction coil 3 and through a connector 34 on the control circuit 100. An input line of the current driving circuit for vertical magnetic field correction 17 is connected to a D/A converting output terminal P11 of a microcomputer 21 through a voltage amplifying circuit 27.

An output terminal of a voltage amplifying circuit 13 is connected to an A/D converting input terminal AD2 of the microcomputer 21, and a vertical direction magnetic field sensing element (or also called vertical magnetic field sensor) 11 to an input terminal of the voltage amplifying circuit 13.

An output line of an vertical magnetic field correction current detecting circuit 23 is connected to an A/D converting input terminal AD4 of the microcomputer 21, and two differential input terminals of the vertical magnetic field correction current detecting circuit 23 are connected to both ends of the vertical direction magnetic field correction coil 3 through the connector 34, to which voltage generated by direct-current resistance of the vertical direction magnetic field correction coil 3 is applied. Further, the AD4 terminal is appliedwith voltage that corresponds to the current running through the vertical direction magnetic field correction coil 3.

The horizontal direction magnetic field sensing element 4 outputs a voltage that is proportional to the intensity of geomagnetism to the A/D converting input terminal AD1 of the microcomputer 21 through the voltage amplifying circuit 6.

The microcomputer 21 performs A/D conversion and numerization of the voltage applied to the A/D converting input terminal AD1, adds or subtracts horizontal magnetic field sensor offset correction data preliminarily stored in the non-volatile memory 19 and obtains horizontal magnetic field detection data.

Next, the microcomputer 21 obtains, by following a preliminarily set process, canceling coil driving data proportional to the horizontal magnetic field detection data, adds or subtracts horizontal correction coil driving circuit offset data preliminarily stored in the non-volatile memory 19, and obtains horizontal direction magnetic field correction coil driving data.

Then, the microcomputer 21 outputs this data by D/A converting the same through the D/A converting output terminal P10 whereupon it is provided to the current driving circuit for horizontal magnetic field correction 10 through the voltage amplifying circuit 26.

The current driving circuit for horizontal magnetic field correction 10 provides current that is proportional to the input voltage to the horizontal magnetic field correction coil 2, and consequently generates a magnetic field that corrects influences of geomagnetism in a horizontal direction (the direction along tube axial).

As explained so far, the external magnetic field correcting device according to this embodiment comprises an external magnetic field detector including the horizontal direction magnetic field sensing element 4 and/or vertical direction magnetic field sensing element 11, an external magnetic field correction coil including the horizontal direction magnetic field correction coil 2 and/or vertical direction magnetic field correction coil 3, an external magnetic field correction coil current detecting circuit including the horizontal magnetic field correction current detecting circuit 22 and/or vertical magnetic field correction current detecting circuit 23, and a current driving circuit for external magnetic field correction including the current driving circuit for horizontal magnetic field correction 10 and/or the current driving circuit for vertical magnetic field correction 17.

Figure 4:
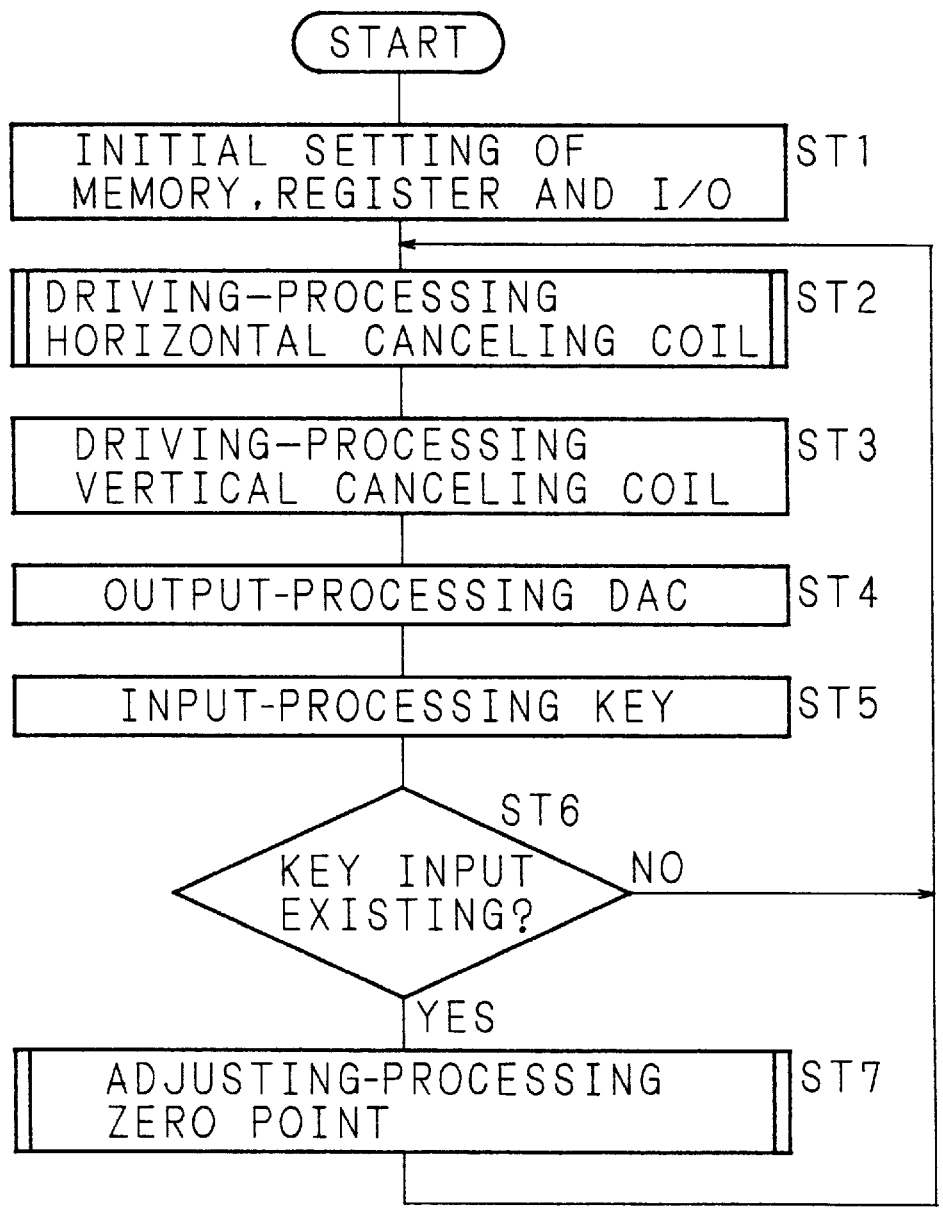
FIG. 4 is a flowchart showing operations of an external magnetic field correction device of a CRT display device according to an embodiment of the present invention.
Figure 5:
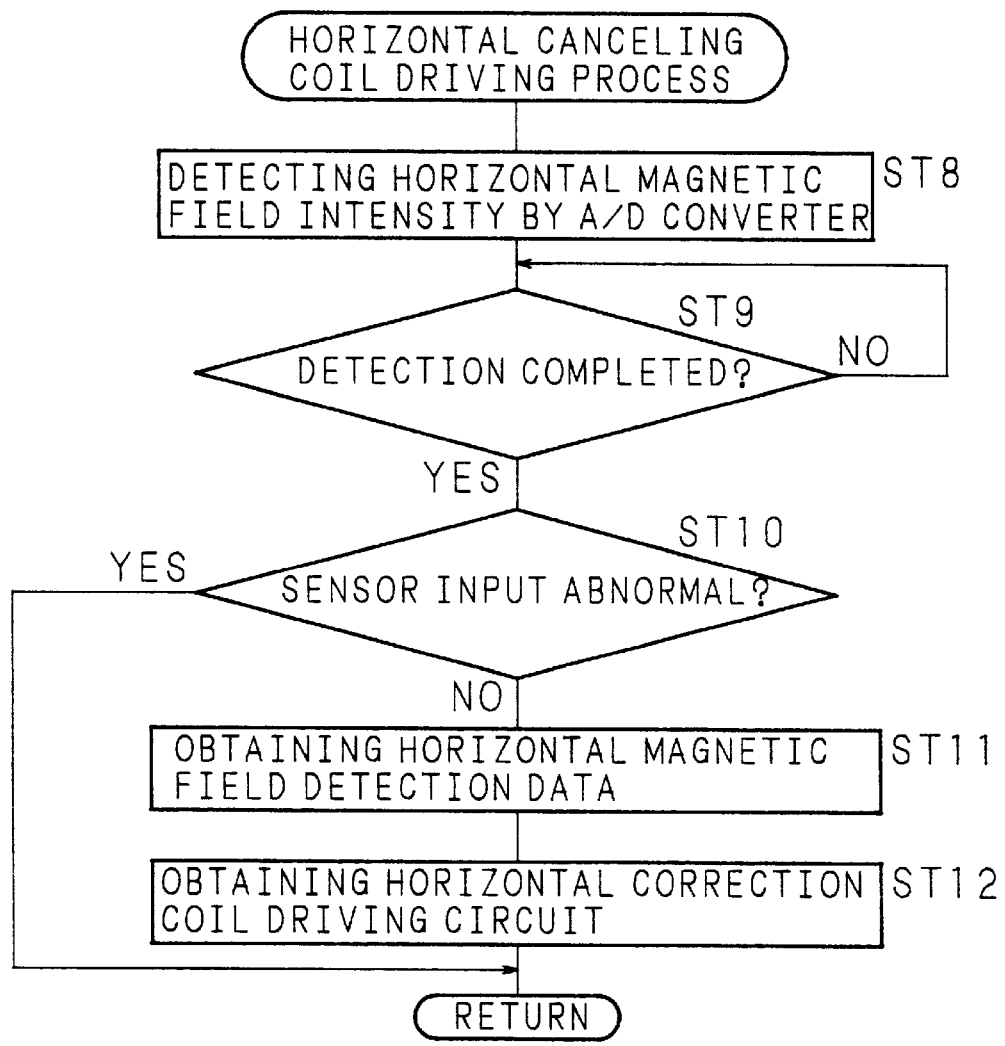
FIG. 5 is a flowchart showing creating operations for horizontal magnetic field correction data out of the operations of an external magnetic field correction device of a CRT display device according to an embodiment of the present invention.
Figure 6A:
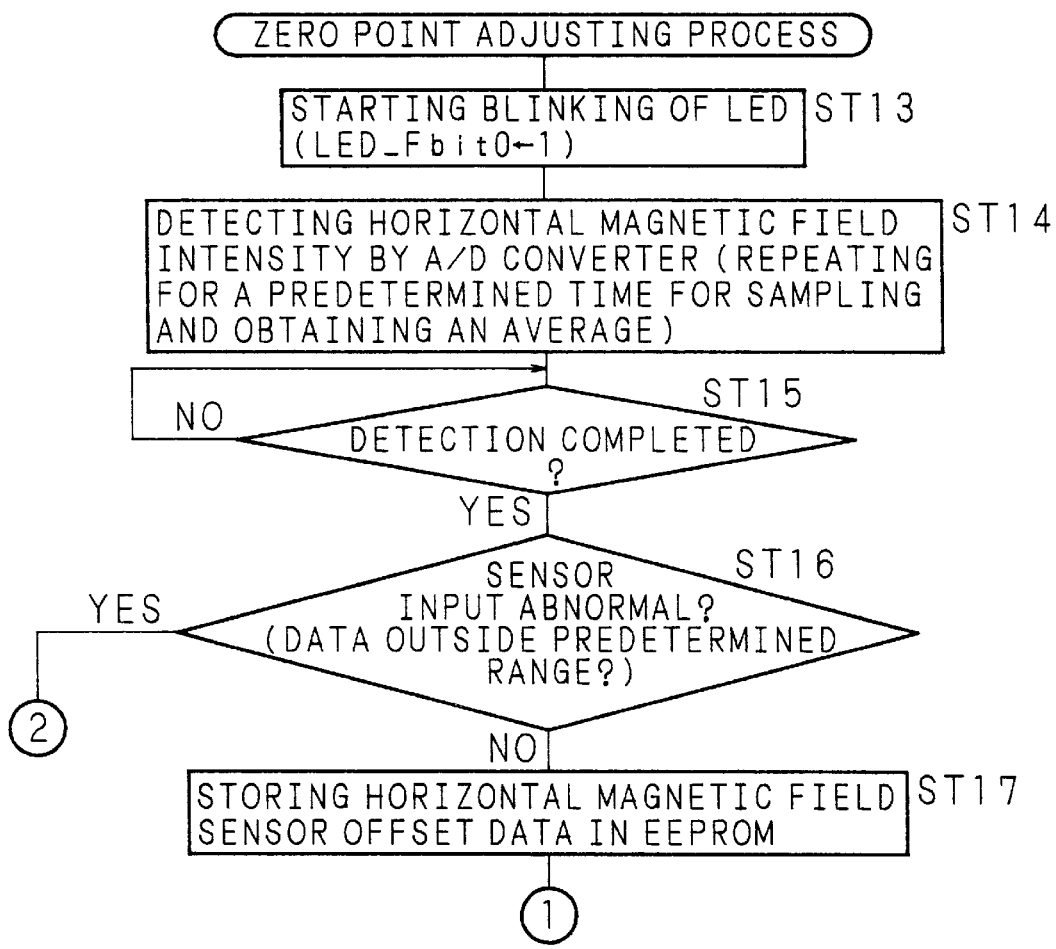
FIG. 6 is a flowchart showing offset current adjusting operations for a horizontal magnetic field correction coil out of the operations of an external magnetic field correction device of a CRT display device according to an embodiment of the present invention.
Figure 6B:
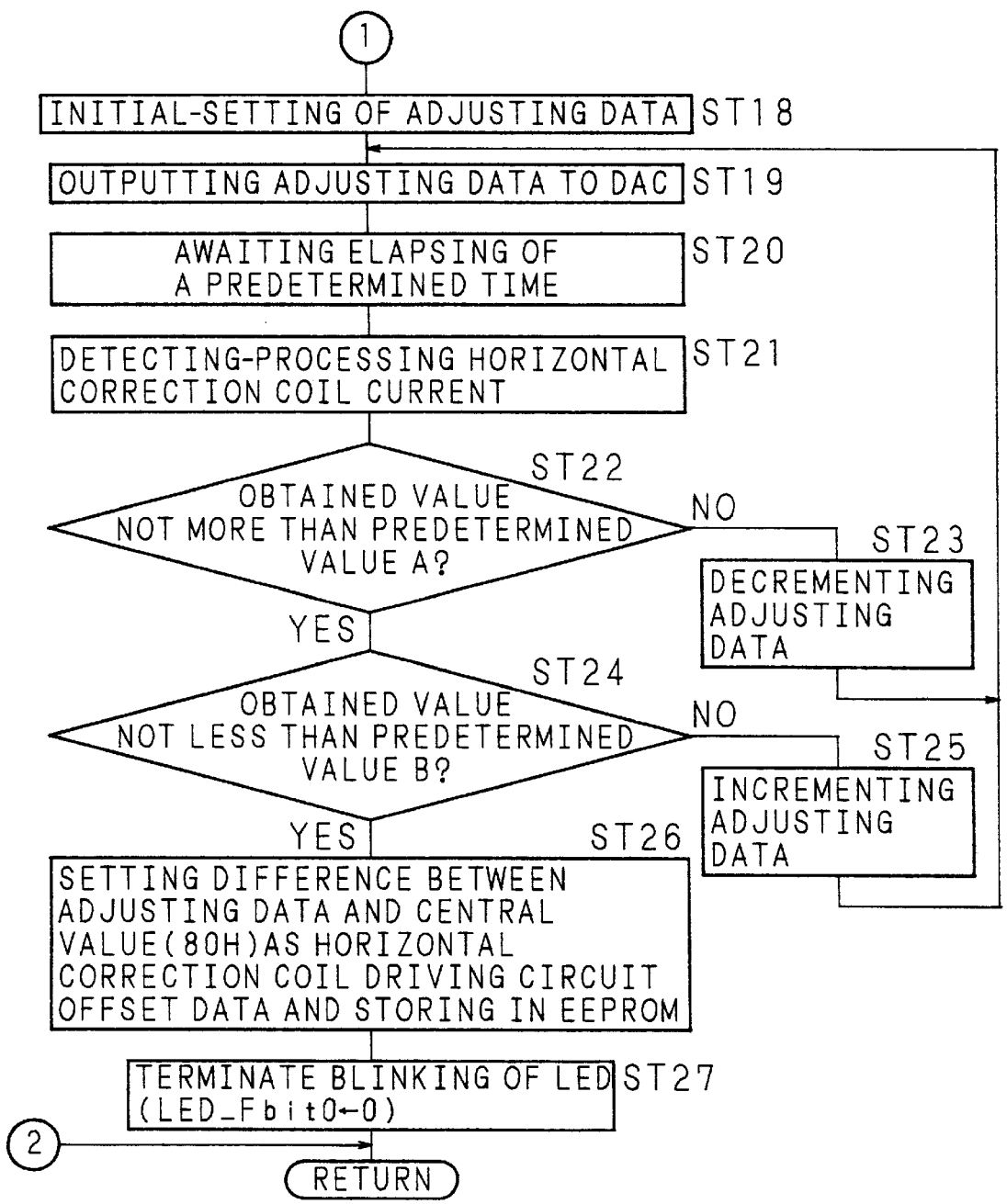

It will now be explained for concrete operations based on the operational flowchart of the microcomputer as shown in FIG. 4, FIG. 5 and FIG. 6.

In FIG. 4, initial setting of input/output terminals of built-in memory, register, D/A converter or the like of the microcomputer is first performed (step ST1).

Next, detection of a horizontal magnetic field is performed by AD1 terminal input, and based on the detected value, correction is performed, and a horizontal canceling coil driving process for determining horizontal correction coil driving data corresponding to the detected value for the horizontal magnetic field is performed(step ST2).

Then, detection of a vertical magnetic field is performed by AD2 terminal input, and based on the detected value, correction is performed, and a vertical canceling coil driving process for determining vertical correction coil driving data corresponding to the detected value for the vertical magnetic field is performed (step ST3).

Thereafter, the thus obtained horizontal correction coil driving data and vertical horizontal correction coil driving data are D/A converted and respectively output from D/A converter outputs P10 and P11 (step ST4).

Next, a signal level of the P12 terminal is read and a key input condition of the tact switch 25 is checked (step ST5), and in case no key input exists, the operation is returned to the above ST2 and repeats the operations of ST2 to ST5 (step ST6).

In case key input exists, zero point adjustment of offset current running through the horizontal magnetic field correction coil 2 and the vertical magnetic field correction coil 3 is performed (step ST7).

At this point, the external magnetic field around the CRT display device is set to zero as a condition for performing key input.

Next, it will be explained in details of contents of the operations of the above step ST2 based on FIG. 5.

First, detection of horizontal magnetic field intensity is started by input through A/D converter input AD1 (step ST8), and awaits completion of detecting operation (step ST9).

Next, it is checked whether the detected data is within a predetermined range, and if it is outside the range, it is determined that an abnormality has occurred, whereupon the process is interrupted and skipped. In other words, abnormal input eliminating operation is performed (step ST10).

If the detected data is within the range, the input data is added to correction value horizontal magnetic field sensor offset data to correct by the offset amount of the sensor, and horizontal magnetic field detection data is obtained (step ST11).

Further, the horizontal magnetic field detection data is converted according to a preliminarily set means (such as referring to a table or proportional calculation), and the obtained value is added to a horizontal correction coil driving offset data to correct by the offset of the driving circuit, and horizontal correction coil driving data is obtained(step ST12).

The same applies to the operations of step ST3 in FIG. 4.

The operations of step ST7 in FIG. 4 will be explained based on FIG. 6.

First, blinking of the display device (LED) 29 is started to indicate that adjusting operation is being executed (step ST13).

Then, detection of a horizontal magnetic field intensity is started by an input of the A/D converter input AD1, repeated for a predetermined time for sampling and calculation of an averaged value (step ST14), and awaits completion of detecting operation (step ST15).

Next, it is checked whether the detected data is within a predetermined range, and if it is outside the range, it is determined that an abnormality has occurred, whereupon the process is interrupted and skipped (step ST16).

Thereafter, a difference between the sensor detected input and a designed central value (fixed value) is calculated, and the obtained value is stored in the non-volatile memory (EEPROM) 19 as a correction data horizontal magnetic field sensor offset data (step ST17).

Next, initial setting of adjusting data to an appropriate value is performed (step ST18).

Then, the adjusting data is D/A converted and output through D/A converter output P10 (step ST19).

To correspond to a delay in operational response of the circuit, elapsing of a predetermined time is awaited (step ST20).

A voltage corresponding to current running through the horizontal direction magnetic field coil 2 is applied to the A/D converter AD3, and operational current of the horizontal direction magnetic field correction coil 2 is detected (step ST21).

It is judged whether the thus detected value is not more than a predetermined value A or not, and if the value is greater than A, the operation proceeds to step ST23, subtracts 1 from the adjusting data, and returns to step ST19.

If the value is not more than A, the operation proceeds to step ST24 to judge whether the value is not less than a predetermined value B, and if the value is smaller than B, the operation proceeds to step ST25, adds the adjusting data to 1, and returns to step ST19.

If it is judged in step ST24 that the value is not less than B, it is determined that the current running through the horizontal direction magnetic field correction coil 2 has converged within a regular value, and a difference horizontal correction coil driving circuit offset data between the adjusting data and the designed central value (fixed value) is calculated to be stored in the non-volatile memory (EEPROM) 19 (step ST26).

Lastly, blinking of the display device (LED) 29 is terminated, and the process is completed (step ST27).

By the above operations, correction data horizontal magnetic field sensor offset data and correction data horizontal correction coil driving circuit offset data that are required for setting the current running through the horizontal direction magnetic field correction coil 2 to not more than a predetermined value are obtained and stored in the non-volatile memory (EEPROM) 19.

It should be noted that while it has been only explained for operations related to horizontal magnetic field correction, the same operations are executed for vertical magnetic field correction.

As explained so far, in the external magnetic field correction device according to this embodiment, the correction means for output. offset current and setting means of the correction value for the output offset current provided in the microcomputer automatically adjust and correct irregularities in offset current originating in operational irregularities of a magnetic sensor or driving circuit.

In other words, by measuring a current, running through the magnetic field correction coil when the external magnetic field is zero, the correction value setting means for the output offset current provided in the microcomputer obtains a correction value for the output offset current from correction coil driving data when the current is limited to be not more than a predetermined value and this correction value is stored in the non-volatile memory.

Then, the correction means for the output offset current, that is, the offset value adjusting unit corrects a magnetic field correction data determined based on the detected value for the external magnetic field by the correction value for the output offset current, and operates as to make the current running through the magnetic field correction coil (offset current) to be not more than a predetermined value when the external magnetic field is zero.

In other words, in this embodiment, it has been made possible to set a correction value to limit the output current offset value for the magnetic field correction coil when the external magnetic field is zero to not more than a predetermined value, and to limit the output current offset value for the magnetic field correction coil in an operating condition when the external magnetic field is zero to not more than a predetermined value by the arrangement of a microcomputer, amplifying circuit, magnetic sensor, non-volatile memory, current detector, instructing switch, output offset current correction means and correction value setting means for output offset current within the microcomputer, and by pressing the instructing switch (tact switch) after setting the external magnetic field to zero. Consequently, a magnetic field correction device of high accuracy that saves the time for adjustments can be obtained.

Embodiment 2

Figure 7:
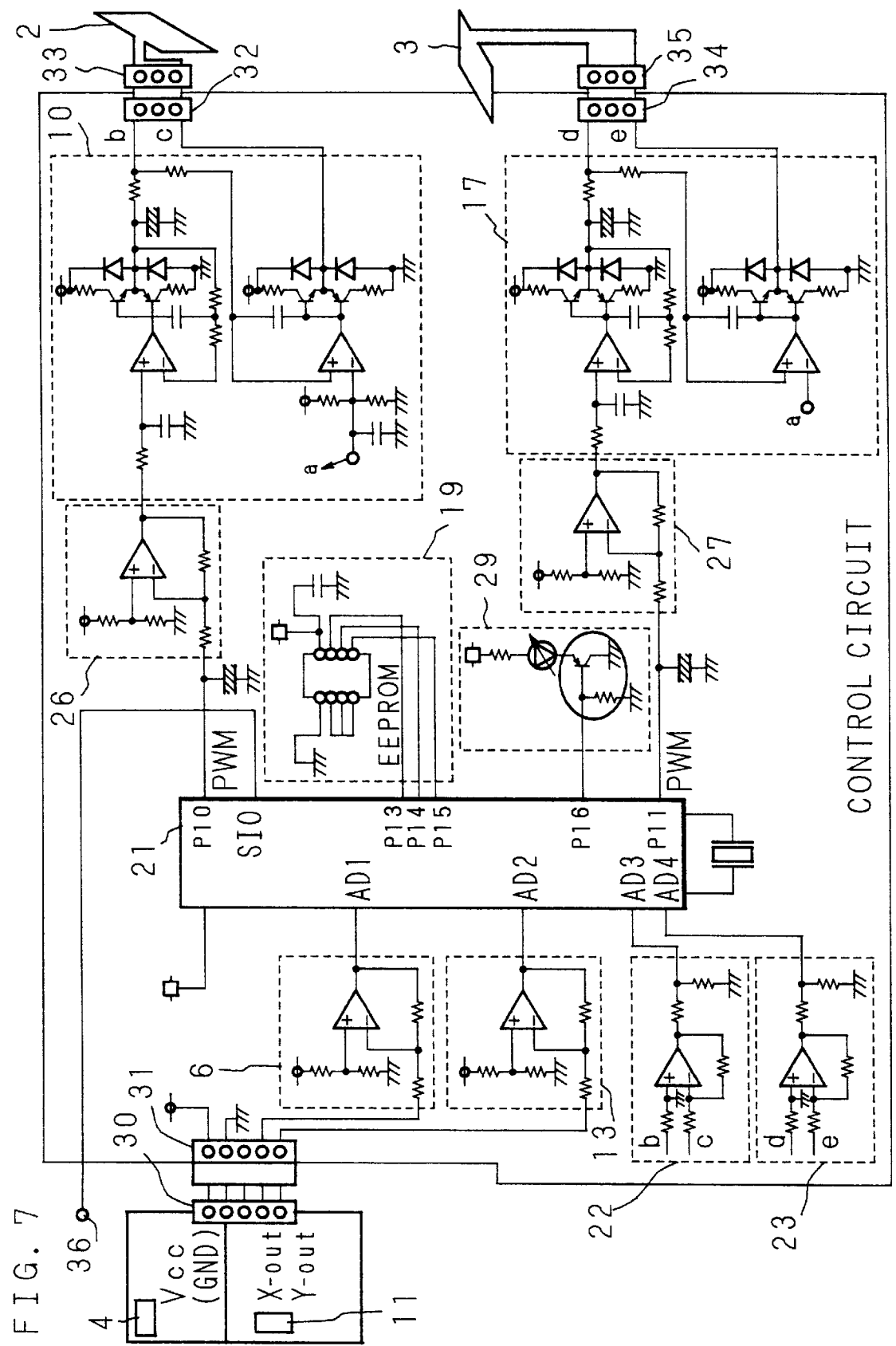
FIG. 7 is a block diagram showing a constitution of an external magnetic field correction device according to embodiment 2.

FIG. 7 is a block diagram showing a constitution of an external magnetic field correction device according to embodiment 2.

In this embodiment, the tact switch (instructing switch) 25 in the drawings related to embodiment 1 has been replaced by employing a built-in serial communication interface SIO and a communication connector 36 of the microcomputer 21. The disposal of a communication means in the microcomputer 21 for communicating with the exterior and the provision of a communication terminal connected thereto enables adjustment through an external automatic adjusting device by using the communication means instead of manual adjustment by the user through operating the tact switch (instructing switch) 25.

In addition, the display device (LED) 29 can also be omitted besides the tact switch 25.

Embodiment 3

Figure 8:
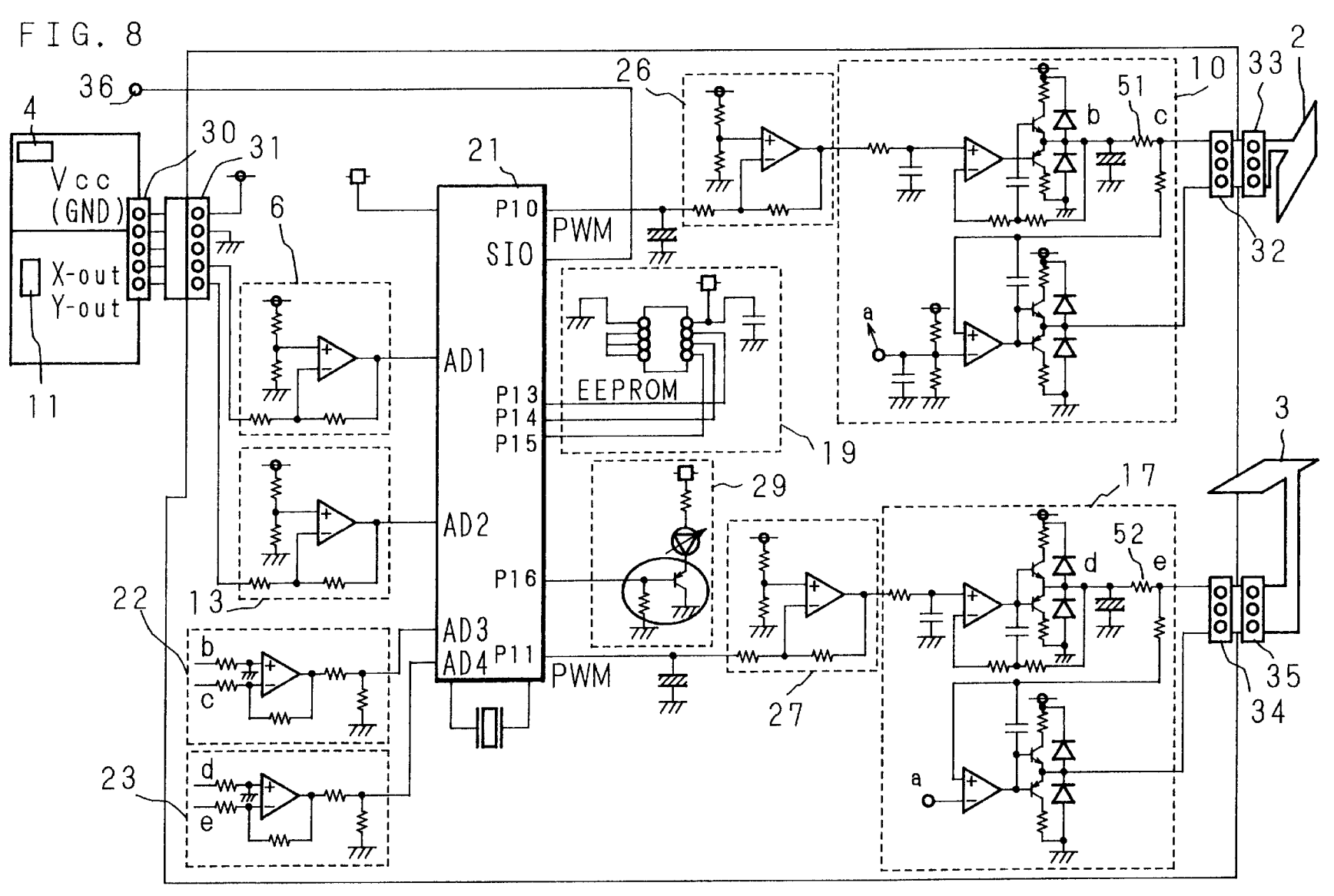

FIG. 8 is a block diagram showing a constitution of an external magnetic field correction device according to embodiment 3.

In this embodiment, instead of connecting both ends of the horizontal direction magnetic field correction coil 2 and the vertical direction magnetic field correction coil 3 to the horizontal magnetic field correction current detecting circuit 22 and the vertical magnetic field correction current detecting circuit 23 that are their respective current detecting circuits as in the constitution of embodiment 2 as shown in, for instance, FIG. 7, connection is performed so that a signal of both ends of a resistor 51 serially connected to the horizontal direction magnetic field correction coil 2 is made to be an input signal for the horizontal magnetic field correction current detecting circuit 22 and that a signal of both ends of a resistor 52 serially connected to the vertical direction magnetic field correction coil 3 is made to be an input signal for the vertical magnetic field correction current detecting circuit 23.

The same constitution may be employed for the constitution of embodiment 1 as shown in FIG. 3.

By respectively utilizing voltages of both ends of resistors 51, 52 serially connected to horizontal and vertical direction magnetic field correction coils 2, 3 as input signals for the horizontal and vertical magnetic field correction current detecting circuits 22, 23 as above, the current value of the horizontal and vertical direction magnetic field correction coils 2, 3 can be accurately detected by a simple circuit, regardless to irregularities in resistance values for the horizontal and vertical direction magnetic field correction coils 2, 3.

Embodiment 4

Figure 9:
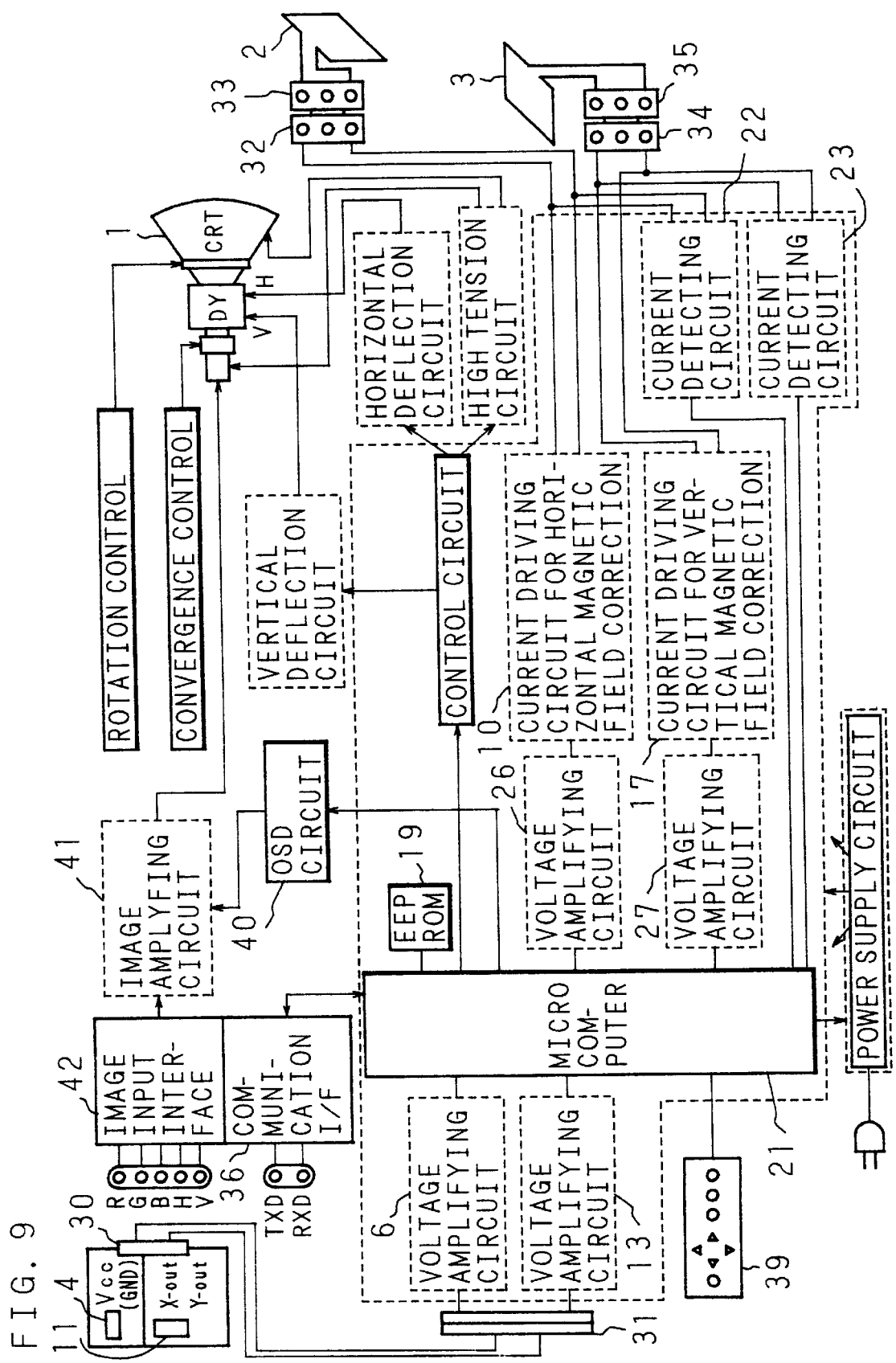
FIG. 9 is a block diagram showing a constitution of an external magnetic field correction device according to embodiment 4.

FIG. 9 is a block diagram showing an example of a CRT display device comprising the external magnetic field correction device according to embodiment 1 as shown in FIG. 3.

In FIG. 9, a matrix switch 39 is a switch on an adjusting panel provided in a front face of the CRT display for adjusting, in a normal condition, screen luminance or color tone.

An OSD circuit 40 is an on screen display device for displaying a menu or an adjusting value at the time of screen adjustment.

41 denotes an image amplifying circuit an input line of which is connected to an image input interface 42 and the OSD circuit 40 and an output line of which is connected to a cathode electrode of the CRT 1. The microcomputer 21 constantly observes an input condition of the matrix switch, and when it is judged that an input exists, making the OSD circuit 40 actuate.

When the OSD circuit 40 is actuated, a menu selecting picture is displayed on a display screen of the CRT 1.

This menu includes that for adjustment of the external magnetic field correction device, and when operation is performed following preliminarily set processes, adjustment operations for the external magnetic field correction device are actuated, whereby the same effects as those of embodiment 1 shown in FIG. 3 can be obtained.

As this invention maybe embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

I claim:

1. An external magnetic field correction device comprising:
    an external magnetic field detector for detecting an external magnetic field around a CRT;
    an external magnetic field correction coil disposed around the CRT for correcting the external magnetic field;
    a current driving circuit for external magnetic field correction for supplying to the external magnetic field correction coil correction current for correcting the external magnetic field on the basis of a detected value of the external magnetic field detector; and
    an offset value adjusting unit for adjusting an offset value for the current driving circuit for external magnetic field correction so that an output of the current driving circuit for external magnetic field correction at the time that the external magnetic field around the CRT is zero is made to be not more than a predetermined value, and for storing an adjusted value.

2. The external magnetic field correction device according to claim 1, further comprising an abnormal input eliminating unit for determining that an abnormality has occurred when the output of the external magnetic field detector is not less than a predetermined value and accordingly interrupting operation of the offset value adjusting unit.

3. The external magnetic field correction device according to claim 1, wherein the offset value adjusting unit includes a communication means for receiving from an external adjustor instructions for adjusting the offset value for the current driving circuit for external magnetic field correction.

4. The external magnetic field correction device according to claim 1, further comprising an external magnetic field correction coil current detecting circuit for detecting a value for current running through the external magnetic field correction coil, and the external magnetic field correction coil current detecting circuit is a resistor serially connected to the external magnetic field correction coil.

5. A CRT display device comprising:
    a CRT display; and
    an external magnetic field correction device including
        an external magnetic field detector for detecting an external magnetic field around a CRT display;
        an external magnetic field correction coil disposed around the CRT display for correcting the external magnetic field;
        a current driving circuit for external magnetic field correction for supplying to the external magnetic field correction coil correction current for correcting the external magnetic field on the basis of a detected value of the external magnetic field detector; and
        an offset value adjusting unit for adjusting an offset value for the current driving circuit for external magnetic field correction so that an output of the current driving circuit for external magnetic field correction at the time that the external magnetic field around the CRT display is zero is made to be not more than a predetermined value, and for storing an adjusted value.

6. The CRT display device according to claim 5, further comprising an abnormal input eliminating unit for determining that an abnormality has occurred when the output of the external magnetic field detector is not less than a predetermined value and accordingly interrupting operation of the offset value adjusting unit.

7. The CRT display device according to claim 5, wherein the offset value adjusting unit includes a communication means for receiving from an external adjustor instructions for adjusting the offset value for the current driving circuit for external magnetic field correction.

8. The CRT display device according to claim 5, further comprising an external magnetic field correction coil current detecting circuit for detecting a value for current running through the external magnetic field correction coil, and the external magnetic field correction coil current detecting circuit is a resistor serially connected to the external magnetic field correction coil.

9. The CRT display device according to claim 5, further comprising an OSD circuit for making an adjusting menu for providing instructions to perform correction of external magnetic field to the external magnetic field correction device to be displayed on the CRT display.

10. The CRT display device according to claim 6, further comprising an OSD circuit for making an adjusting menu for providing instructions to perform correction of external magnetic field to the external magnetic field correction device to be displayed on the CRT display.

11. The CRT display device according to claim 7, further comprising an OSD circuit for making an adjusting menu for providing instructions to perform correction of external magnetic field to the external magnetic field correction device to be displayed on the CRT display.

12. The CRT display device according to claim 8, further comprising an OSD circuit for making an adjusting menu for providing instructions to perform correction of external magnetic field to the external magnetic field correction device to be displayed on the CRT display.

* * * * *